US010752515B2

(12) United States Patent
Kotnala et al.

(10) Patent No.: US 10,752,515 B2
(45) Date of Patent: Aug. 25, 2020

(54) LITHIUM-SUBSTITUTED MAGNESIUM FERRITE MATERIAL BASED HYDROELECTRIC CELL AND PROCESS FOR PREPARATION THEREOF

(71) Applicant: Council of Scientific & Industrial Research, New Delhi (IN)

(72) Inventors: Ravinder Kumar Kotnala, New Delhi (IN); Jyoti Shah, New Delhi (IN)

(73) Assignee: COUNCIL OF SCIENTIFIC & INDUSTRIAL RESEARCH (IN)

( * ) Notice: Subject to any disclaimer, the term of this patent is extended or adjusted under 35 U.S.C. 154(b) by 476 days.

(21) Appl. No.: 15/067,496

(22) Filed: Mar. 11, 2016

(65) Prior Publication Data

US 2016/0285121 A1  Sep. 29, 2016

(30) Foreign Application Priority Data

Mar. 23, 2015  (IN) .......................... 0792/DEL/2015

(51) Int. Cl.
*C01G 49/00* (2006.01)
*H01M 4/38* (2006.01)
(Continued)

(52) U.S. Cl.
CPC ............ *C01G 49/0036* (2013.01); *C25B 1/04* (2013.01); *C25B 5/00* (2013.01); *H01M 4/38* (2013.01);
(Continued)

(58) Field of Classification Search
CPC .......... H01M 6/32; H01M 6/34; H01M 14/00; H01M 12/04; H01M 4/38; C01G 49/0036;
(Continued)

(56) References Cited

U.S. PATENT DOCUMENTS 4,039,409 A   8/1977  LaContin et al.
4,057,479 A   11/1977  Campbell
(Continued)

FOREIGN PATENT DOCUMENTS

WO   WO 89/11165   11/1989
WO   WO 98/44578   10/1998
(Continued)

OTHER PUBLICATIONS

Fu et al., Electrical and magnetic properties of magnesium-substituted lithium ferrite, Jan. 29, 2010, Ceramics International, 36 (2010), pp. 1311-1317.*

(Continued)

*Primary Examiner* — Eugenia Wang
(74) *Attorney, Agent, or Firm* — Seyfarth Shaw LLP; Brian Michaelis

(57) ABSTRACT

The present invention describes a lithium-substituted magnesium ferrite material based hydroelectric cell and process for preparation thereof. A novel galvanic cell process of generating electric current in distilled water by lithium substituted magnesium ferrite hydroelectric cell has been developed. A synthesis process of ferrite pellet having zinc anode and silver inert electrode has been developed. The material splits water molecules and conducts ions within porous ferrite. Split ions electrochemically react with electrodes and form zinc hydroxide at anode and hydrogen gas at silver electrode. This hydroelectric cell has generated 5 mA short circuit current and 950 mV open cell voltage. Current increased to 20 mA by thermally deposited Zn electrode on a ferrite pellet. The cell is very economical and highly sensitive towards electrolysis of water molecules. It is a green source for producing energy and has a potential to excel from existing electrochemical batteries.

16 Claims, 6 Drawing Sheets

(51) Int. Cl.
  *H01M 14/00* (2006.01)
  *C25B 1/04* (2006.01)
  *H01M 12/04* (2006.01)
  *C25B 5/00* (2006.01)
  *H01M 6/34* (2006.01)
  *H01M 4/42* (2006.01)

(52) U.S. Cl.
  CPC .......... *H01M 12/04* (2013.01); *H01M 14/00* (2013.01); *C01P 2006/14* (2013.01); *C01P 2006/40* (2013.01); *H01M 4/42* (2013.01); *H01M 6/34* (2013.01); *Y02E 60/366* (2013.01)

(58) Field of Classification Search
  CPC . C25B 1/04; C25B 5/00; Y02E 60/366; C01P 2006/14; C01P 2006/40
  See application file for complete search history.

(56) References Cited

U.S. PATENT DOCUMENTS

| | | | |
|---|---|---|---|
| 4,173,525 A | 11/1979 | Kakamatsu et al. | |
| 4,312,436 A | 1/1982 | Martin et al. | |
| 5,427,871 A | 6/1995 | Garshol et al. | |
| 5,436,090 A | 7/1995 | Kono et al. | |
| 5,527,639 A | 6/1996 | Noda et al. | |
| 5,587,258 A | 12/1996 | Fehrmann et al. | |
| 6,074,771 A | 6/2000 | Cubukcu et al. | |
| 7,393,440 B2 | 7/2008 | Ghosh et al. | |
| 8,323,817 B2 | 12/2012 | Gordon | |
| 8,932,977 B2 | 1/2015 | Dismukes et al. | |

FOREIGN PATENT DOCUMENTS

| | | |
|---|---|---|
| WO | WO 2008/138048 A1 | 11/2008 |
| WO | WO 2012/054842 A2 | 4/2012 |

OTHER PUBLICATIONS

Kotnala et al., Humidity response of Li-substituted magnesium ferrite, Oct. 7, 2007, Sensors and Actuators; B 129, 909-914 (Year: 2009).*

* cited by examiner

LITHIUM-SUBSTITUTED MAGNESIUM FERRITE MATERIAL BASED HYDROELECTRIC CELL AND PROCESS FOR PREPARATION THEREOF

CROSS REFERENCE TO RELATED APPLICATION

The present patent application claims priority to Indian Patent Application No. 0792/DEL/2015 filed on Mar. 23, 2015, the disclosure of which is hereby incorporated by reference.

FIELD OF THE INVENTION

The present invention relates to a lithium substituted magnesium ferrite based material, hydroelectric cells, and a process for the preparation thereof. More particularly, the invention relates to electric current and voltage generation in distilled water by a lithium substituted magnesium ferrite hydroelectric cell at room temperature. The lithium substituted magnesium ferrite is in the form of a pellet that splits water as well as conduct ions similar to a solid electrolyte having attached to both sides thereof a zinc plate as an anode and a silver comb electrode as an inert electrode serving to provide electric current and voltage, whereby zinc hydroxide nanoparticles are deposited on the zinc anode plate and hydrogen gas is produced at the inert silver electrode.

BACKGROUND & PRIOR ART OF THE INVENTION

Hazardous gases produced by petroleum and coal are major threats to earth's environment. There is a need for alternative green energy sources. Among green energy sources, solar cells and fuel cells are technologies that are growing fast. However, these energy sources are expensive and involve tedious manufacturing processes. The eighteenth century discovery of voltaic piles of zinc and silver disks interweaved with saturated electrolyte absorbent paper brought a revolution in portable power sources. Different combinations of electrodes and electrolytes were experimented. Since then electrochemical batteries are being abundantly used for generating energy by chemical reaction for low power consumption devices. Popular conventional secondary power sources that are used include lithium ion batteries, silver-zinc batteries, lead acid batteries, and alkaline batteries. Among all primary and secondary electrochemical batteries, a combination of electrodes with electrolytes are essential and specific to the power requirement. Modifications in electrode material for electrochemical cells are an ongoing process to improve life and performance of the cell. But electrolytes are still i-s a must for either dry or wet cell chemical reactions to proceed. To improve electrode performance various depolarizer materials have been invented. There are still areas for improvement in existing components and processes of conventional galvanic cells by making modifications in the methods and materials used.

Electrolysis cells with a solid synthetic polymer electrolyte for water dissolution are described in U.S. Pat. Nos. 4,312,436, 4,039,409 and 4,057,479. The limitations for the dissociation of water molecules require bipolar plates with a continuous supply of electricity and water on both sides of the electrolyte membrane attached with a porous catalyst thereof. A tedious manufacturing process is involved in making such an electrolytic cell. Here in this invention a simple and easy hydroelectric cell consisting of a lithium substituted magnesium ferrite pellet with one side having a zinc plate as an anode and other side a silver comb electrode thereof with the ability to dissociate water molecules as well as to cause ion conduction similar to solid electrolyte.

An alkali metal electrode, an alkali ion-conduction membrane and a cathode for separating an alkali metal anode from a cathode are described in U.S. Pat. No. 8,323,817 B2, The limitation of the separation of an electrolyte from contacting and corroding an anode is the critical layer thickness of a porous and non-porous ion-conducting membrane. Another limitation of the described cell is well suited for seawater/marine devices only. Here a solid ceramic material consisting of electrodes of zinc and silver is serving as a water splitter and solid electrolyte for ion conduction. Another important feature of this material is that it can generate energy in pure water without adding any electrolyte.

Another galvanic seawater cell with an inert cathode electrode using oxygen in seawater as a depolarizer is described in U.S. Pat. No. 5,427,871, WO89/11165, PTC/N090/0056. The limitations of these cells is that they required seawater and dissolved oxygen in the cells. The other disadvantage is that seawater contains other metal cations like magnesium, calcium, etc., and gets deposited on a cathode that degraded the performance of the cell. Here in this invention deionized water is used for the cell to generate electric energy. The use of deionised water decreases the probability of premature degradation of the cell due to metal cations on the electrodes, and decreases the performance of the cell.

Humidity sensitivity of $Mg_{1-x}Li_xFe_2O_4$ ($0.0<x<0.6$) samples prepared by solid-state reaction of inorganic precursors $MgSO_4$, $LiNO_3$, $Fe(NO_3)_3$ $9H_2O$, NaOH and NaCl have been described in SCI Journal Sensors And Actuators B 129 (2008) 909-914. The main drawback of the samples is the porosity of the samples is in the range 2.6 to 9.7%. Also NaOH was added to convert metal nitrates and sulfates into hydroxides, whereas NaCl restricted the growth of grains to keep the size as small as possible. Whereas, in the present invention, carbonates of magnesium and lithium and oxides of iron have been used to prepare the sample of porosity 32-38%. No other chemicals other than oxides and carbonates are required.

Ferrites compositions of the formula: $Li_xMg_{0.5}Ni_{0.5-2x}Fe_{2+x}O_4$, where x=0.00 to 0.25 in steps of 0.05, are prepared by a standard double sintering method sintered at a temperature of 1200° C. in air for 6 hours have been described in Advanced Chemistry Letters, 1 (2), 104 (2013). The effect of nickel in magnetic and dielectric properties have been studied in said compound. The limitation of the compound is very high sintering temperature 1200° C. required to synthesize said compound. Porosity of the said compound is between 11-14%. Here, in the present invention, the sintering temperature is lower at 1000° C., and the porosity of the compound is in the range 32-38%.

In the present invention, a simple and easy energy generating cell based on water splitting by lithium substituted magnesium ferrite without adding any electrolyte and a collection of ions using a pair of zinc and silver electrodes has been proposed. The main feature is the ability to generate electrical energy for the time scale of several hours in deionized/ordinary water. In this invention, lithium substituted magnesium ferrite has been synthesized which can dissociate water molecules and allows ion conduction also. To collect the dissociated ions, zinc as an anode electrode and silver as an inert electrode are used on lithium substituted magnesium ferrite pellet. After dipping in deionized water, a 4 mA current and potential of 950 mV is developed across the hydroelectric cell and is stable for 10 minutes. The cell was stable at 0.3 mA and 800 mV even after 380 h. This cell can be reused after ultrasonic cleaning and drying. The output current has been increased to 40 mA and 950 mV for a larger 17 $cm^2$ area cell. The byproducts of the cell reaction are zinc hydroxide and hydrogen gas, which can be further enhanced by a series of a combination of cells. A high purity zinc hydroxide precipitate which is then heated produces zinc oxide nanoparticles obtained by this cell reaction at the anode. As a result of the cell reaction, hydrogen gas is also produced at the inert electrode which can be collected for utilizing as a fuel. No hazardous byproducts are produced by this cell. Another important feature of this hydroelectric cell is the ability to generate economical green electrical energy. So it is a clean energy source with a cost effective price.

OBJECTS OF THE INVENTION

The main objective of the invention is to develop a lithium substituted magnesium ferrite material useful for a hydroelectric cell.

Another objective of the present invention is to develop a lithium substituted magnesium ferrite material based hydroelectric cell.

Yet another objective of the present invention is to develop zinc and silver electrodes applied on a ferrite pellet, after dipping in deionised/ordinary/sea water to produce an electric current and voltage due to water molecule dissociation and ion conduction.

Still another objective of the invention is to process a lithium substituted magnesium ferrite material into a pellet.

Still yet another objective of the invention is to deposit a silver comb inert electrode by RF sputtering on the material pellet.

Still another objective of the invention is to the adhesion of a zinc anode plate electrode on the material pellet.

Another objective of the invention is to dissociate water molecules by the cell in distilled water.

Another objective of the invention is to the conduction of dissociated ions by the ferrite material in distilled water.

Still another objective of the invention is to collect ions and produce current by the electrodes of the cell.

Yet another objective of the invention is to produce a 5 mA current by the cell reaction in distilled water.

Still another objective of the invention is to produce a voltage of 950 mV by the cell in distilled water.

Still another objective of the invention is to produce zinc hydroxide at the anode as the byproducts of cell reaction.

Another objective of the invention is to produce $H_2$ as the byproducts of the cell reaction.

Yet another objective of the invention is to obtain cost effective production of power ~1.85 mWatt.

Still another objective of the invention is to develop a process for the preparation of a lithium substituted magnesium ferrite based hydroelectric cell.

BRIEF SUMMARY OF THE INVENTION

Accordingly, the present invention provides a lithium substituted magnesium ferrite material useful for making a hydroelectric cell comprised of magnesium carbonates, lithium carbonates and iron oxide in the molar ratio in the range of 0.75 to 0.85: 0.05 to 0.15 0.95 to 1.05, with a porosity in the range of 32-38% and grain size in the range of 50-800 nm.

In an embodiment of the present invention, the molar ratio of magnesium carbonates, lithium carbonates and iron oxide is 0.8:0.1:1.

Accordingly, the present invention also provides a hydroelectric cell using a lithium substituted magnesium ferrite material consisting of three parts, i) a lithium-substituted magnesium ferrite material comprising of magnesium carbonates, lithium carbonates and iron oxide in the molar ratio in the range of 0.75 to 0.85 0.05 to 0.15:0.95 to 1.05, with a porosity in the range of 32-38% and a grain size in the range of 50-800 nm (2); ii) a zinc plate adhered on the one side of the material as an anode (3); and iii) comb electrodes of silver deposited by radio frequency sputtering as an inert electrode on other side of the material (1), dipping said hydroelectric cell in water to generate a stable electric current in the range of 5 to 0.3 mA and a voltage in the range of 950-800 mV for a period in the range of 0.17 to 380 hrs.

In an embodiment of the present invention, a hydroelectric cell generates by-products zinc hydroxides on the zinc electrode and hydrogen gas on the silver electrode.

In another embodiment of the present invention, the lithium substituted magnesium ferrite material is square having dimension 24×24 mm with applied pressure 10 ton.

In yet another embodiment of the present invention, water is deionized, distilled or sea water, preferably deionized or distilled water.

In still another embodiment of the present invention, three cells of 24 mm×24 mm size, which are connected in series and dipped in water, light up six LEDs for a period of 9 to 10 days.

Accordingly, the present invention also provides a process for the preparation of a lithium-substituted magnesium ferrite hydroelectric cell, comprising the steps of:
  i) wet grinding powder of carbonates of Mg and Li and oxide of iron in a molar ratio in the range of 0.75 to 0.85: 0.05 to 0.15:0.95 to 1.05 with acetone for a period of 50 to 70 minutes to obtain homogenized powder,
  ii) presintering with a ramp rate of 5° C./min the homogenized powder of step i) at a temperature in the range of 750 to 850° C. for a period in the range of 7 to 9 hrs,
  iii) grinding the said presintered powder of step ii) for a period of 50 to 70 minutes and forming square pellets,
  iv) sintering the square pellets of step iii) at a temperature in the range of 1000-1100° C. with a ramp rate of 5° C./min for a period of 4 to 6 hrs,
  v) processing a silver comb electrode on one side of square pellets of step iv) by radio frequency sputtering at 70 to 80 watts for a period in the range of 25 to 35 mins,
  vi) sticking a zinc plate electrode on the other side of the square pellet of step v) to obtain a lithium-substituted magnesium square ferrite pellets based hydroelectric cell.

In an embodiment of the present invention, the preferable presintering temperature is 800° C. and time is 8 hrs in step ii) and a sintering temperature is 1000° C. and a time period 5 hrs in step iv).

In another embodiment of the present invention, the ratio of acetone to mixed powder ratio in step i) is 1:1 by vol/wt.

The present invention comprises of the synthesis process of a lithium substituted magnesium ferrite material based hydroelectric cell for dissociation of water molecules comprising the steps of (i) the optimization of the processing time and temperature for the synthesis of lithium substituted magnesium ferrite material (ii) the preparation of pellets of ferrite material having square dimensions at an optimum applied pressure, (iii) the said square pellet was optimized for its porous character, (iv) a process of making a zinc anode electrode scheme on ferrite material, (v) a process of deposition of silver comb inert electrodes on ferrite material, (vi) production of electric current by the cell in distilled water, (vii) production of voltage by the cell in distilled water, (viii) deposition of zinc hydroxide on the zinc electrode as a result of a cell reaction, and (ix) production of hydrogen gas at an inert silver electrode as a result of a cell reaction.

In another embodiment of the present invention, a method of processing a lithium substituted magnesium ferrite material for a hydroelectric cell wherein the calcinations temperature was 800° C. and sintering temperature 1000° C. for 8 h and 5 h respectively.

Another embodiment of the present invention includes a method of making a square pellet of the ferrite material of dimension 24×24 mm$^2$ with applied pressure 10 ton for the cell.

In yet another embodiment of the present invention the porosity of the said square ferrite material pellet was about 35%±3%.

Another embodiment of the present invention includes a process of making a zinc anode electrode on said square ferrite material pellet.

Another embodiment of the present-invention includes a process of making an inert silver comb electrode on said square ferrite material pellet.

Another embodiment of the present invention includes splitting of water molecule by the cell on dipping in distilled water.

Another embodiment of the present invention includes conduction of ions by the ferrite material in said cell due to splitting of water molecule on dipping the cell in distilled water.

In another embodiment of the present invention, the production of electric current was 4 mA stable for 10 min by dipping the cell in distilled water.

In yet another embodiment of the present invention, the production of voltage was 950 mV by dipping cell in distilled water.

In still another embodiment of the present invention, the hydroelectric cell reaction produced zinc hydroxide as a byproduct on the zinc anode.

In yet another embodiment of the present invention, the hydroelectric cell reaction produces hydrogen gas on an inert silver electrode.

In yet another embodiment of the present invention, the electric current stability of the hydroelectric cell was 0.3 mA after 380 h.

In yet another embodiment of the present invention, the voltage stability of the hydroelectric cell was 800 mV after 380 h.

In a further embodiment of the present invention, the processing cost of lithium substituted magnesium ferrite hydroelectric cell is low.

BRIEF DESCRIPTION OF THE DRAWINGS AND TABLES

FIG. 5 is the X-ray diffraction pattern of precipitate deposited at an anode zinc plate '3' in FIG. 1a.

Figure 1A:
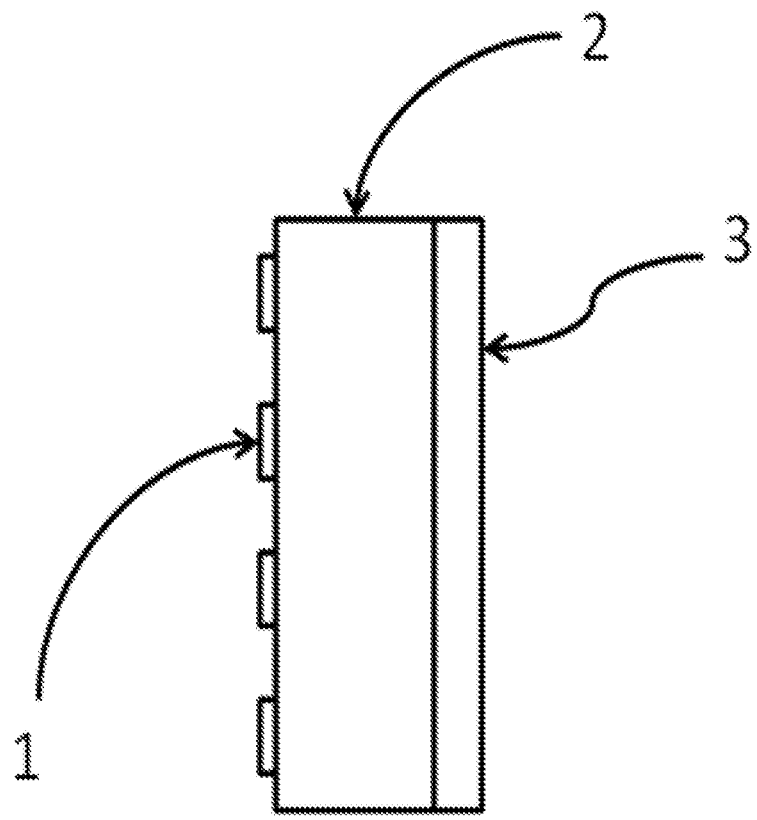
FIG. 1a shows a side view of a hydroelectric cell consisting of '1' silver electrode, '2' lithium substituted magnesium ferrite pellet and '3' zinc plate.

Table 1 is the open cell voltage and short circuit current generated by the cell with time.

TABLE 1

Open cell voltage and short circuit current generated by the cell with time
Output of Cell 2 dipped in Distilled Water

| Time (Hr ± 0.01) | Short circuit Current (mA) | Open cell Voltage (mV) |
|---|---|---|
| 0.17 | 5 | 950 |
| 0.5 | 4.8 | 950 |
| 1.5 | 1.8 | 1000 |
| 30 | 1 | 900 |
| 45 | 0.3 | 870 |
| 170 | 0.3 | 870 |
| 380 | 0.3 | 870 |

DETAILED DESCRIPTION OF THE INVENTION

In the present invention a hydroelectric cell processing based on water splitting at room temperature by lithium substituted magnesium ferrite has been proposed.

$MgCO_3$ (AR Grade), $Li_2CO_3$ (AR Grade) and $Fe_2O_3$ (AR Grade) (were taken in ratio 0.8±0.05:0.1±0.05:1±0.01). Powders of the three precursors were wet ground with acetone in pestle with mortar for 1 h to make them fine and homogenized. The ground powder mixture was kept in the furnace in air at 800° C. for 8 h at 5° C./min. Presintered powder was again ground for 1 h. 2 g powder was weighed for making various pellets. Square pellets of dimension 24 mm were formed from the powder. The pressure applied by a hydraulic press was 10 Ton. Several uniform pellets were kept for sintering at 1000° C. for 5 h in air @5° C./min. Thickness of square pellets was 1 mm. Porosity of the pellet was calculated by porosity formula:

The percentage porosity % p of a sample was calculated by using the formula:

$$\% \, p = 100(1 - d/dx) \quad (1)$$

where d is the experimental density=mass/volume, and dx is the theoretical X-ray density.

The X-ray density was calculated by the formula $$d_x = 8M/Na^3 \quad (2)$$

where M is the molecular mass of the ferrite composition, N is the Avogadro number, and a is the lattice parameter of the synthesized ferrite.

The porosity of the ferrite pellet has been calculated as 32-38%. Synthesized pellets as described here were masked on one side with a comb electrode pattern. Masked electrodes were placed inside an RF vacuum chamber on a heater. The base vacuum was created ~5×10$^6$ mbar. Silver was sputtered on masked pellets at 80 watts RF power for 30 min. The pellet temperature was 200° C. during silver deposition. After silver comb electrode deposition at one face of the pellet, zinc plate as anode electrode was applied on other face of pellet. Lithium substituted magnesium ferrite dissociate water molecules and also allows ion conduction. To collect the dissociated ions zinc as an anode electrode and silver as inert electrode are used on a lithium substituted magnesium ferrite pellet. After dipped in DI/ordinary water a 5 mA current and potential of 950 mV is developed across the hydroelectric cell and is stable for 10 minutes. The cell was stable at 0.3 mA and 800 mV even after 380 h. This cell can be reused after ultrasonic cleaning and drying. The output current has been increased to 40 mA and 950 mV for a larger 17 cm² area cell. Further, when the cell area increased 3 times, current increases 8 times. The byproducts of the cell reaction are zinc hydroxide and hydrogen gas, which can be further enhanced by series combination of the cells. High purity zinc hydroxide precipitate which further by heating produces zinc oxide nanoparticles obtained by this cell reaction at anode. As a result of the cell reaction hydrogen gas is also produced at the inert electrode which can be collected for utilizing as a fuel. No hazardous byproducts are produced by this cell. Another important feature of this hydroelectric cell is the ability to generate economical green electrical energy. So it is a clean energy source with a cost effective price.

Figure 1B:
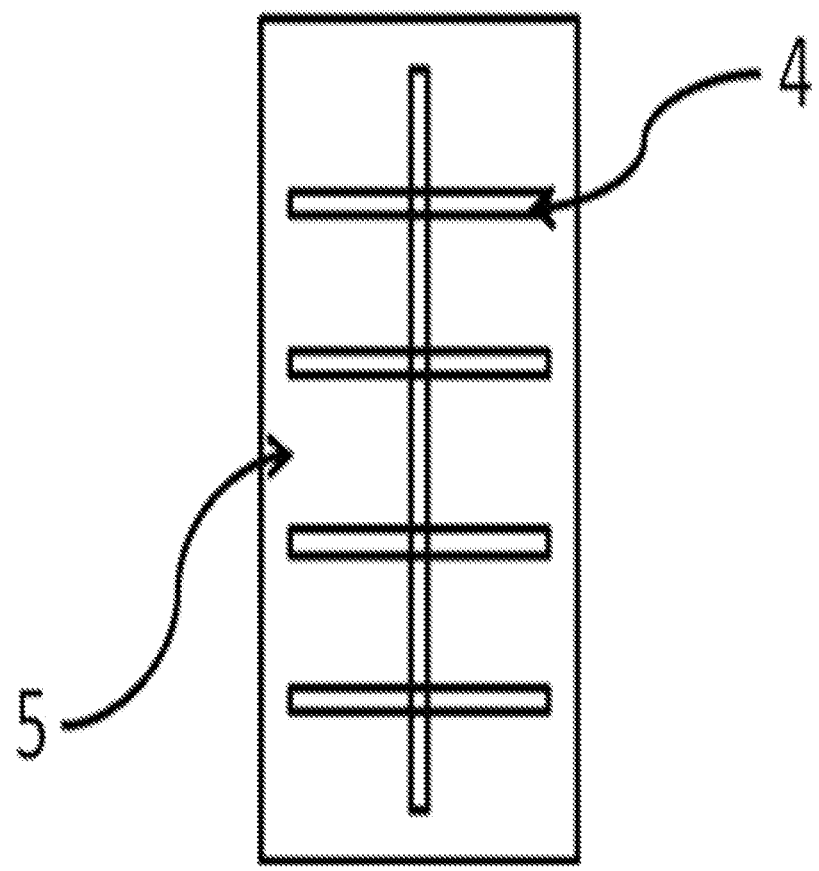
FIG. 1b is a front view of the cell with '4' a silver comb electrode on '5' a lithium substituted magnesium ferrite pellet.
Figure 2:
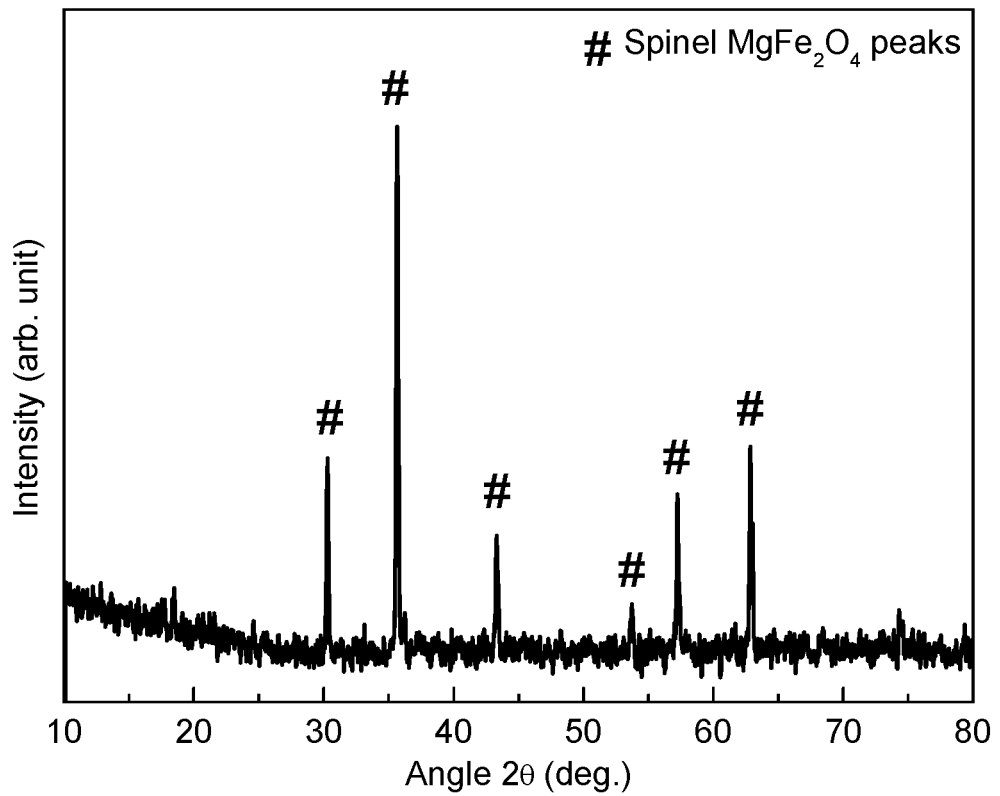
FIG. 2 is the X-ray diffraction pattern of a synthesized lithium substituted magnesium ferrite pellet '2' in FIG. 1a,b.
Figure 3:
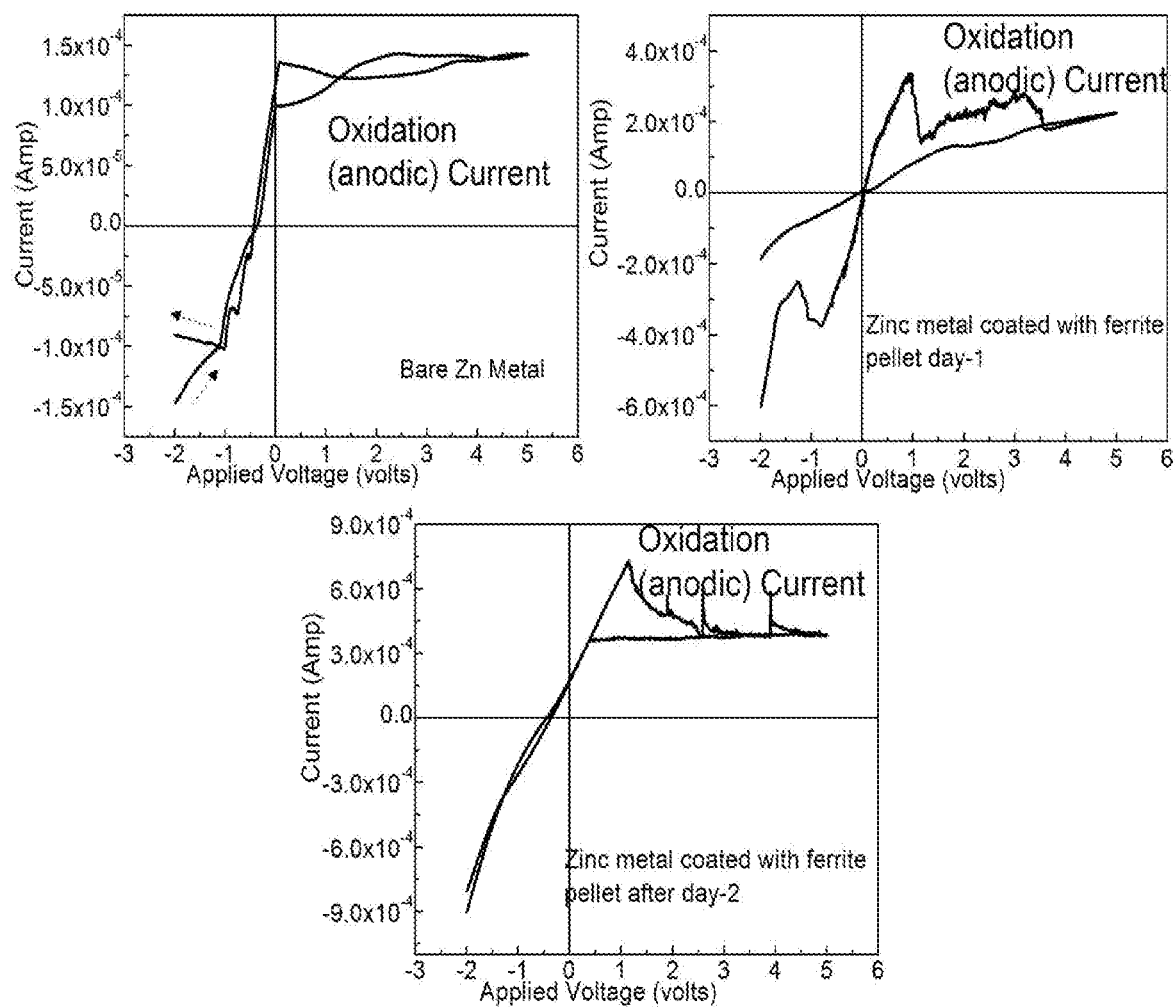
FIG. 3 is the cyclic Voltammetry of zinc metal in DI deionized water and with pellet pasted on the zinc metal on day 1 and day 2.
Figure 4:
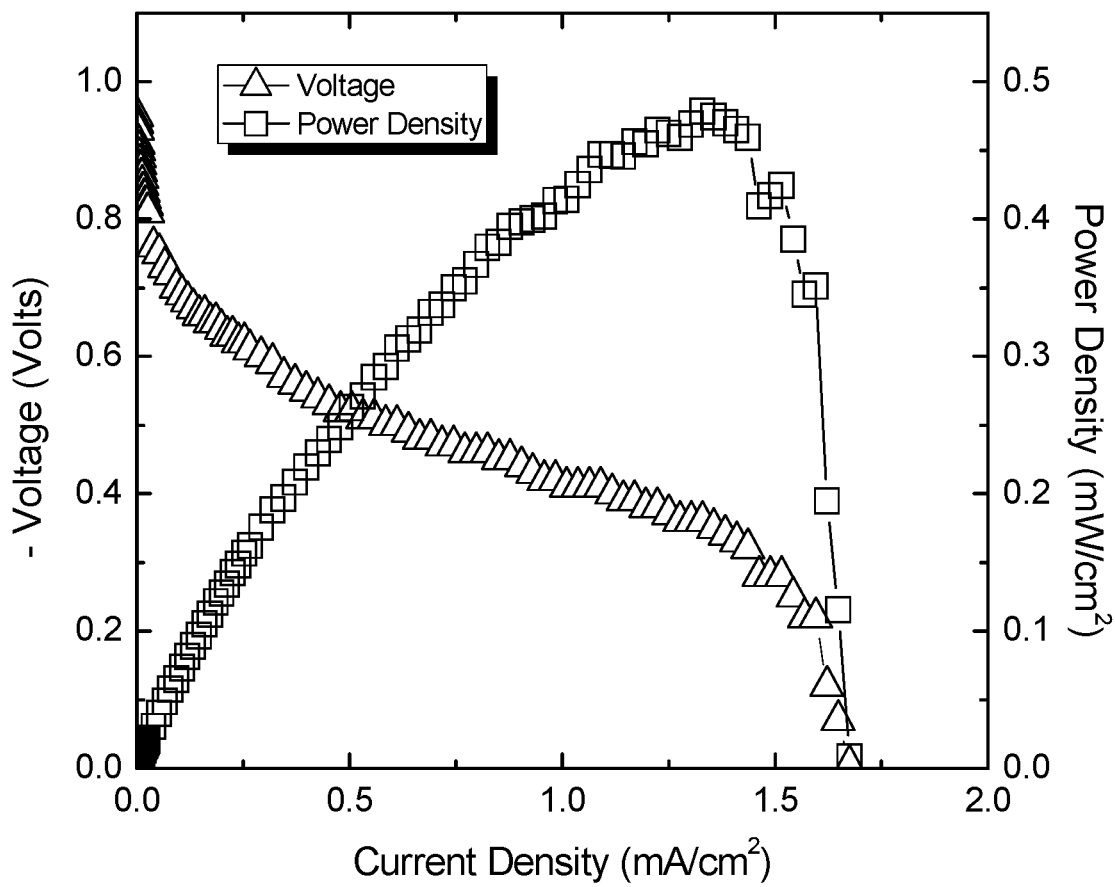
FIG. 4 is a cell performance in deionized water showing open cell voltage and power density of the cell with applied current density.
Figure 5:
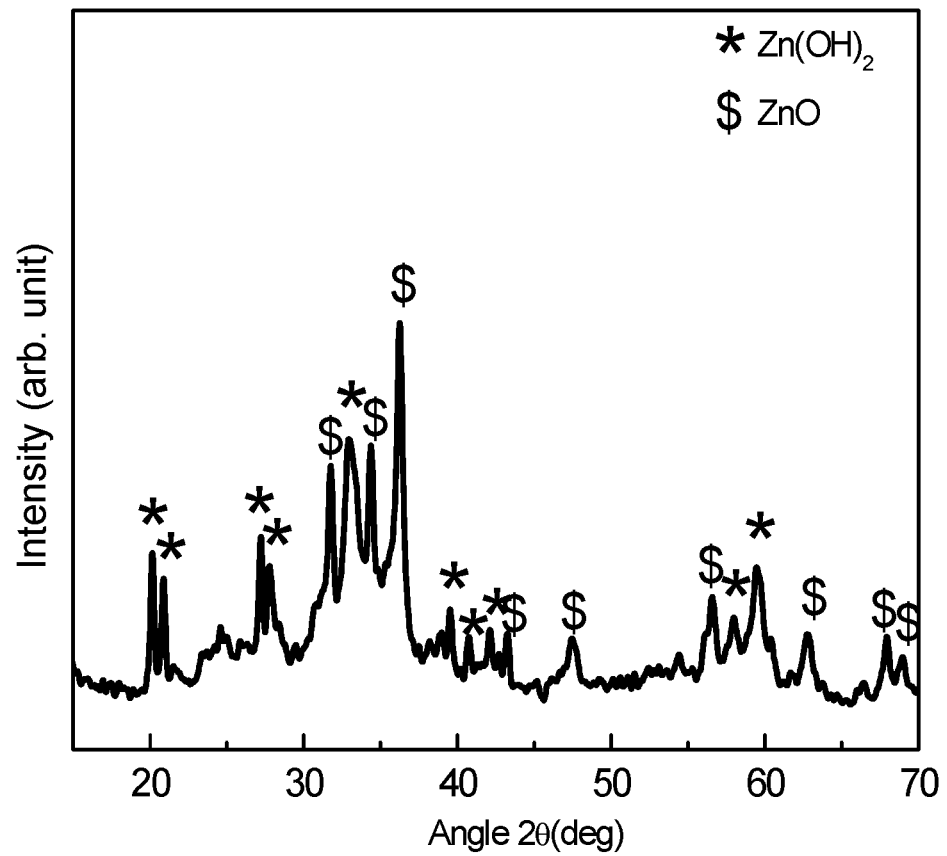

In FIG. 1a '2' shows the synthesized lithium substituted magnesium ferrite 24 mm square pellet with maximum area exposed to the humidity. '1' in FIG. 1b, shows the comb electrodes of silver deposited by RF sputtering as inert electrode. FIG. 1a '3' shows zinc plate stick stuck on the other face of pellet with adhesive as the anode. FIG. 2 is the X-ray diffraction pattern of spinel phase formation confirmation of synthesized lithium substituted magnesium ferrite. Cyclic Voltametcry voltammetry of the bare zinc plate as a working electrode in DI water is performed. And the effect of the ferrite material on the zinc electrode is also examined as shown in FIG. 3. A very small plateau of zinc at 0.06 V increased to 0.9 V on day 1 with ferrite covering and anodic current also increased. On day 2, the plateau increased to 1.1 V and the anodic current also increased. It indicates potential of $Zn(OH)_2$ deposition at the Zinc electrode due to dissociation of a water molecule. The lithium substituted magnesium ferrite square pellet with zinc and silver electrodes is the complete cell assembly. When this cell is slightly dipped in distilled water an initial electric current of the order of 5 mA starts flowing and a potential difference of 950 mV developed across the electrodes. This current remains stable for 10 min, then it starts falling and remains stable 0.3 mA for 380 h. Deionized water of resistance 18MΩ has been taken to avoid any conduction due to free ions. The cell performance is shown in FIG. 4. It shows the polarization curve (open cell potential) with applied current density exhibiting activation polarization, Ohmic polarization and mass transport regions. The cell generated maximum power density of 0.5 mW/cm². The cell resistance is very high of the order of hundreds of Mega Ohms. Thus a highly resistive cell after slight dipping in highly resistive DI water gives electric current. As a result of electric conduction in the cell, a white precipitate starts to deposit after 10 min at the anode zinc plate. The white precipitate at the anode is dried and characterized for phase analysis by XRD shown in FIG. 5. The XRD pattern FIG. 5 shows the crystalline phase of zinc hydroxide and zinc oxide. The white precipitate impedes the current flow in the cell which has to be cleaned intermediately. When the cell is dipped in DI/ordinary water, instantly a few bubbles formed at the inert silver electrode during current flow.

The possible conduction by dipping the cell in DI/ordinary water is due to enough electric field inside the capillary pores as lithium substituted magnesium ferrite dissociates water molecules into $H^+/H_3O^+$ and $OH^-$ ions. Dissociated hydroxide ions further provide an electric field to dissociate more water molecules. The cell not only dissociate water molecule, it also permits the $H_3O^+$ via hydrogen bonding among water molecules. $OH^-$ ions moves towards Zn plate and forms the $Zn(OH)_2$ which is deposited at the zinc electrode. The silver electrode is working as the inert electrode accepting electrons from the zinc electrode and producing $H_2$ gas by reducing $H^+$ ions. The confirmation of $H_2$ gas production was done by putting a hydrogen sensor at the opening of a 500 ml sealed conical flask inside which four cell were dipped in DI water. The possible reaction mechanism of water cell may be given as:

At Lithium modified $MgFe_2O_4$

$$2H_2O \rightarrow 2H^+ + 2OH^- \tag{3}$$

At Anode (zinc)

$$Zn + 2OH^- \rightarrow Zn(OH)_2 + 2e^- \tag{4}$$

At Cathode (silver)

$$2H^+ + 2e^- \rightarrow H_2\uparrow \tag{5}$$

Overall Reaction

$$Zn + 2H_2O \rightarrow Zn(OH)_2 + H_2\uparrow \tag{6}$$

The white precipitate at the zinc electrode is collected and characterized by X-ray diffraction. XRD peaks matched with $Zn(OH)_2$.

Novelty:

A novel galvanic cell process of generating electric current in distilled water by a lithium substituted magnesium ferrite hydroelectric cell has been developed. It is entirely a new method of an existing galvanic cell since eighteenth century primary cells such as Volta pile, Daniel, Leclanche and Edison primary cell, etc. Processing of the cell is very economical and highly sensitive towards dissociation of water molecules. It is a green source for producing electrical energy and has a potential to excel from existing electrochemical cells.

Inventive Steps:

Splitting of water molecules by ferrite has been observed at high temperature and by photosynthesis. Splitting of water molecules at room temperature has not been yet observed by ferrite or any other metal oxide for direct generation of electrical energy. The novelty of this invention is splitting of water molecule at room temperature as well as conduction of ions through lithium substituted magnesium ferrite. Also, selection of a combination of electrode metals for the collection of ions to produce electric current and voltage has been obtained.

Utility:

The important feature of this hydroelectric cell is the ability to generate economical electrical energy. So it is a clean energy source with a cost effective price. This hydroelectric cell can be used in a wide variety of both consumer products and industrial equipment. It has potential applications as portable power generation for mobile equipment like cellular phones, mobile charging, torch, video camera, laptop charger etc. These cells can be used as panels as a battery for stationary power generation. Hydroelectric cells can safely produce power for biological applications, such as hearing aids and pacemakers. The byproduct of the cell, hydrogen gas, can be further utilized for fuel. This cell can be reused after ultrasonic cleaning and drying. The byproduct of cell reaction is zinc hydroxide and hydrogen gas, which can be further enhanced by series combination of cells. High purity zinc hydroxide precipitate which further by heating produces zinc oxide nanoparticles obtained by this cell reaction at the anode. As a result of the cell reaction hydrogen gas is also produced at the inert electrode which can be collected for utilizing as a fuel. No hazardous byproducts are produced by this cell.

A $Mg_{0.8}Li_{0.2}Fe_2O_4$ cell pellet of area 4.8 cm² generates 5 mA current and 950 mV voltage when dipped in water.

The following examples are given by way of illustration of the working of the inventions in actual practice and should not be construed to limit the scope of the invention.

Examples

1. Solid state synthesis process of $Mg_{0.8}Li_{0.2}Fe_2O_4$ square pellet sintered at 1000° C.

$MgCO_3$ (AR Grade), $Li_2CO_3$ (AR Grade) and $Fe_2O_3$ (AR Grade) were taken in ratio 0.8±:0.05:0.1±0.05:1±0.01. Powders of two carbonates & oxides precursors were wet ground with acetone in a pestle with mortar for 1 h to make them fine and homogenized. 10 ml acetone per gram mixed powder is taken. The ground powder mixture was kept in to the furnace in air at 800° C. for 8 h at 5° C./min. Presintered powder was again ground for 1 h. 2 g powder weighed for making various pellets. Square pellets of dimension 24 mm were formed from the powder. The pressure applied by hydraulic press was 10 Ton. Several uniform pellets were kept for sintering at 1000° C. for 5 h in air @5° C./min. Thickness of square pellets was 1 mm. Porosity of the pellet was calculated between 30-35% by using porosity formula (1).

2. Processing of Silver Squared 1.5 cm² Area Electrode and Zinc Plate on Ferrite Pellet Synthesized pellets as described in example 1 were masked on one side with 1.5 cm² electrode pattern. Masked electrodes were placed inside RF vacuum chamber on heater. The base vacuum was created ~5×10⁻⁶ mbar. Silver was sputtered on masked pellets at 80 watts RF power for 30 min. The pellet temperature was 200° C. during silver deposition. After silver squared electrode deposition at one face of pellet, zinc plate of 25 mm² area as anode electrode was pasted on other face of pellet.

| Output of Cell 2 dipped in Distilled Water | | |
|---|---|---|
| Time (Hr ± 0.01) | Short circuit Current (mA) | Open cell Voltage (mV) |
| 0.17 | 5 | 950 |
| 0.5 | 4.8 | 950 |
| 1.5 | 1.8 | 1000 |
| 30 | 1 | 900 |
| 45 | 0.3 | 870 |
| 170 | 0.3 | 870 |
| 380 | 0.3 | 870 |

3. Processing of Silver Comb Electrode and Zinc Plate on Ferrite Pellet

Synthesized pellets as described in example were masked on one side with comb electrode pattern. Masked electrodes were placed inside RF vacuum chamber on heater, The base vacuum was created ~5×10⁻⁶ mbar. Silver was sputtered on masked pellets at 80 watts RF power for 30 min. The pellet temperature was 200° C. during silver deposition. After silver comb electrode deposition at one face of pellet, zinc plate as anode electrode was applied on other face of pellet.

| Output of Cell 3 dipped in Distilled Water | | |
|---|---|---|
| Time (Hr ± 0.01) | Short circuit Current (mA) | Open cell Voltage (mV) |
| 0.17 | 5 | 950 |
| 0.5 | 3 | 950 |
| 1.5 | 0.8 | 950 |
| 30 | 0.4 | 850 |
| 45 | 0.3 | 800 |
| 170 | 0.3 | 800 |
| 380 | 0.3 | 800 |

4. Solid State Synthesis Process of $Mg_{0.8}Li_{0.2}Fe_2O_4$ Square 1 mm Thick Pellet Sintered at 1100° C.

$MgCO_3$ (AR grade) $Fe_2O_3$ (AR grade) and $Li_2CO_3$ (AR grade) were taken in ratio 0.8:1:0.2. Powders of two carbonates & oxides precursors were wet ground with acetone in pastel with mortar for 1 h to make them fine and homogenized, Ground powder mixture was kept in to the furnace in air at 800° C. for 8 h at 5° C./min. Presintered powder was again ground for 1 h. 2 g powder weighed for making various pellets. Square pellets of dimension 24 mm were formed from the powder. The pressure applied by hydraulic press was 10 Ton. Several uniform pellets were kept for sintering at 1100° C. for 5 h in air @5° C./min. Thickness of square pellets was 1 mm. Silver and zinc electrodes were processed on pellet as described in example 3.

| Output of Cell 4 dipped in Distilled Water | | |
|---|---|---|
| Time (min ± 0.01) | Short circuit Current (mA) | Open cell Voltage (mV) |
| 0.3 | 0.8 | 750 |
| 1 | 1.3 | 750 |
| 3 | 1.5 | 750 |
| 4 | 1 | 700 |
| 5 | 0.8 | 700 |
| 8 | 0.8 | 700 |
| 10 | 0.4 | 700 |

5. Solid State Synthesis Process of $Mg_{0.8}Li_{0.2}Fe_2O_4$ Square 1.5 mm Thick Pellet Sintered at 1100° C.

Synthesized pellets as described in example 4 and silver comb electrode pattern processed as described in example 3. Thickness of square pellets was 1 mm. Porosity of the pellet was 20%. Silver and zinc electrodes were processed on pellet as described in example 3.

| Output of Cell 5 dipped in Distilled Water | | |
|---|---|---|
| Time (min ± 0.01) | Short circuit Current (mA) | Open cell Voltage (mV) |
| 0.3 | 0.3 | 650 |
| 1 | 0.8 | 600 |
| 3 | 1 | 600 |
| 4 | 0.7 | 590 |
| 5 | 0.5 | 590 |
| 8 | 0.2 | 580 |
| 10 | 0.1 | 580 |

6 Processing of Silver Comb Electrode and Zinc Electrodes of 1 cm² Area on Ferrite Pellet Synthesized pellets as described in example I and silver comb electrode pattern processed as described in example 3, Squared mask of 1 cm² on other face of pellet for zinc deposition were placed inside vacuum chamber on heater. The base vacuum was created ~$10^{-5}$ mbar. Zinc was thermally deposited on masked pellets by filament heating. The pellet temperature was 200° C. during zinc deposition. The thickness of the zinc was approximately 0.1 µm.

Output of Cell 6 dipped in Distilled Water

| Time (min ± 0.01) | Short circuit Current (mA) | Open cell Voltage (mV) |
|---|---|---|
| 0.3 | 3 | 850 |
| 1 | 4 | 850 |
| 3 | 6 | 800 |
| 4 | 7 | 800 |
| 5 | 10 | 750 |
| 8 | 10 | 750 |
| 10 | 8 | 700 |

7. Processing of Silver Comb Electrode and Zinc Square Electrodes of 1.5 cm² Area on Ferrite Pellet Synthesized pellets as described in example 1, silver comb electrode pattern processed as described in example 3. Squared mask of 1.5 cm² on other face of pellet for zinc deposition were placed inside vacuum chamber on heater. The base vacuum was created ~$10^{-5}$ mbar. Zinc was thermally deposited on masked pellets by filament beating. The pellet temperature was 200° C. during zinc deposition. The thickness of the zinc was approximately 0.1 µm.

Output of Cell 7 dipped in Distilled Water

| Time (min ± 0.01) | Short circuit Current (mA) | Open cell Voltage (mV) |
|---|---|---|
| 0.3 | 5 | 850 |
| 1 | 6 | 850 |
| 3 | 10 | 800 |
| 4 | 20 | 800 |
| 5 | 20 | 750 |
| 6 | 15 | 750 |
| 8 | 10 | 700 |
| 10 | 6 | 700 |

8. Solid State Synthesis Process of $MgFe_2O_4$ Square Pellet $MgCO_3$ (AR grade) and $Fe_2O_3$ (AR grade) were taken in ratio 1:1. Powders of the two carbonates & oxides precursors were wet ground with acetone in pastel with mortar for 1 h to make them fine and homogenized. Ground powder mixture was kept in to the furnace in air at 800° C. for 8 h at 5° C./min. Presintered powder was again ground for 1 h. 2 g powder weighed for making various pellets. Square pellets of dimension 24 mm were formed from the powder. The pressure applied by hydraulic press was 10 Ton. Several uniform pellets were kept for sintering at 1000° C. for 5 h in air @5° C./min. Thickness of square pellets was 1 mm. Silver and zinc electrodes were processed on magnesium ferrite pellet as described in example 3.

Output of Cell 8 dipped in Distilled Water

| Time (min ± 0.01) | Short circuit Current (mA) | Open cell Voltage (mV) |
|---|---|---|
| 0.3 | 1 | 750 |
| 1 | 2 | 750 |
| 3 | 2.6 | 700 |
| 4 | 1.8 | 700 |
| 5 | 1.6 | 700 |
| 6 | 1.4 | 700 |
| 8 | 1.2 | 650 |
| 10 | 1 | 650 |

9. Solid state synthesis process of $Mg_{0.9}Li_{0.1}Fe_2O_4$ square pellet $MgCO_3$ (AR Grade), $Fe_2O_3$ (AR Grade) and $Li_2CO_3$ (AR grade) were taken in ratio 0.9:1:0.1. Powders of two carbonates & oxides precursors were wet ground with acetone in pastel with mortar for 1 h to make them fine and homogenized. Ground powder mixture was kept in to the furnace in air at 800° C. for 8 h at 5° C./min. Presintered powder was again ground for 1 h. 2 g powder weighed for making various pellets. Square pellets of dimension 24 nm were formed from the powder. The pressure applied by hydraulic press was 10 Ton. Several uniform pellets were kept for sintering at 1000° C. for 5 h in air @5° C./min. Thickness of square pellets was 1 mm. Silver and zinc electrodes were processed on magnesium ferrite pellet as described in example 3.

Output of Cell 9 dipped in Distilled Water

| Time (min ± 0.01) | Short circuit Current (mA) | Open cell Voltage (mV) |
|---|---|---|
| 0.3 | 1 | 900 |
| 1 | 2 | 900 |
| 3 | 4 | 900 |
| 4 | 6 | 850 |
| 5 | 5 | 850 |
| 6 | 4 | 850 |
| 8 | 3.5 | 850 |
| 10 | 3 | 800 |

10. Energizing 6 Red LEDs with Three Hydroelectric Cells Connected in Series

Three hydroelectric cells processed as described in example 1 and example 3 were connected in series. Three hydroelectric cell in DI water generates 2.8 V and 5 mA connected with 6 red LEDs in parallel. These LEDs glow for 10 days on continuous addition of water on cell.

Advantages

1. Simple and easy synthesis process of hydroelectric cell.
2. Low cost oxide materials $Fe_2O_3$, $Li_2CO_3$ & $MgCO_3$.
3. Very small quantity of silver and zinc electrode has been used.
4. No electrolyte, only DI water is used for cell operation.
5. Cell can be reused after ultrasonic cleaning and drying.
6. No hazardous byproducts produced during cell reaction,
7. During cell reaction nanoparticles of zinc-hydroxide are formed.
8. 30-50 ppm hydrogen gas is produced per unit cell reaction.

We claim:

1. A lithium substituted magnesium ferrite material comprising a porosity in a range of 32-38% and a grain size in a range of 50-800 nm, wherein the lithium substituted magnesium ferrite material is made from starting materials magnesium carbonate, lithium carbonate, and iron oxide, each in a molar ratio in a range of 0.75 to 0.85: 0.05 to 0.15: 0.95 to 1.05, respectively.

2. The lithium substituted magnesium ferrite material as claimed in claim 1, wherein the lithium substituted magnesium ferrite material product is made from starting materials magnesium carbonate, lithium carbonate, and iron oxide, each in a molar ratio of 0.8:0.1:1, respectively.

3. The lithium substituted magnesium ferrite material of claim 1, wherein the lithium substituted magnesium ferrite material has a square dimension 24×24 mm after undergoing an applied pressure of 10 tons.

4. A hydroelectric cell comprising a lithium substituted magnesium ferrite material, comprised of three parts, i) the lithium substituted magnesium ferrite material of claim 1 ii) a zinc plate contacted on a first side of said lithium substituted magnesium ferrite material as an anode, and iii) comb electrodes of silver deposited by radio frequency sputtering as an inert electrode on a second side of said lithium substituted magnesium ferrite material, dipping said hydroelectric cell in water to generate a stable electric current in a range of 5 to 0.3 mA and voltage in a range of 950-800 mV for a period in the range of 0.17 to 380 hrs.

5. The hydroelectric cell of claim 4, wherein the hydroelectric cell generates by-products of zinc hydroxides.

6. The hydroelectric cell of claim 4, wherein the water is deionized water, distilled water or sea water.

7. The hydroelectric cell of claim 6, wherein the water is deionized water or distilled water.

8. The hydroelectric cell of claim 4, wherein three cells of 24 mm×24 mm size are connected in series, and when dipped in the water, the three cells generate 2.8 V and 5 mA for a period of 9 to 10 days.

9. A hydroelectric cell comprised of a lithium substituted magnesium ferrite material wherein the lithium substituted magnesium ferrite material is made from starting materials magnesium carbonate, lithium carbonate, and iron oxide, each in a molar ratio in a range of 0.75 to 0.85: 0.05 to 0.15: 0.95 to 1.05, respectively with a porosity in a range of 32-38% and a grain size in a range of 50-800 nm.

10. The hydroelectric cell of claim 9, wherein the lithium substituted magnesium ferrite material is made from starting materials magnesium carbonate, lithium carbonate, and iron oxide, each in a molar ratio of 0.8:0.1:1, respectively.

11. The hydroelectric cell of claim 9, comprising the lithium substituted magnesium ferrite material, a zinc electrode, and a silver electrode, comprising
  i) a pellet comprising the lithium substituted magnesium ferrite material,
  ii) wherein the zinc electrode comprises a zinc plate adjacent to one face of the pellet working as an anode, and
  iii) wherein the silver electrode comprises a comb electrode of silver deposited by radio frequency sputtering adjacent to another side of the pellet working as an inert electrode.

12. The hydroelectric cell of claim 11, wherein said hydroelectric cell is capable of generating a stable electric current in the range of 5 to 0.3 mA and voltage in the range of 950-800 mV for a period in the range of 0.17 to 380 hrs.

13. The hydroelectric cell as claimed in claim 11, wherein said hydroelectric cell generates zinc hydroxides on the zinc electrode and hydrogen gas on the silver comb electrode.

14. The hydroelectric cell as claimed in claim 11, wherein the lithium substituted magnesium ferrite material has a square dimension 24×24 $mm^2$ pellet fabricated by an applied pressure of 10 tons.

15. The hydroelectric cell as claimed in claim 11, wherein the water is deionized or distilled water.

16. The hydroelectric cell as claimed in claim 15, wherein the water is deionized water.

* * * * *